United States Patent
Hirata et al.

(10) Patent No.: US 8,724,264 B2
(45) Date of Patent: May 13, 2014

(54) THIN FILM MAGNETIC HEAD, MAGNETIC HEAD SLIDER, HEAD GIMBAL ASSEMBLY, HEAD ARM ASSEMBLY, MAGNETIC DISK DEVICE AND METHOD OF MANUFACTURING THIN FILM MAGNETIC HEAD

(75) Inventors: Kei Hirata, Tokyo (JP); Takayasu Kanaya, Tokyo (JP); Kosuke Tanaka, Tokyo (JP); Shinji Hara, Tokyo (JP)

(73) Assignee: TDK Corporation, Tokyo (JP)

( * ) Notice: Subject to any disclaimer, the term of this patent is extended or adjusted under 35 U.S.C. 154(b) by 1136 days.

(21) Appl. No.: 12/230,781

(22) Filed: Sep. 4, 2008

(65) Prior Publication Data

US 2010/0053819 A1 Mar. 4, 2010

(51) Int. Cl.
  *G11B 5/33* (2006.01)
  *B82Y 10/00* (2011.01)
  *B82Y 25/00* (2011.01)
  *G11B 5/39* (2006.01)

(52) U.S. Cl.
  CPC ............ *B82Y 10/00* (2013.01); *B82Y 25/00* (2013.01); *G11B 5/3909* (2013.01); *G11B 5/3932* (2013.01); *G11B 5/3912* (2013.01); *G11B 2005/3996* (2013.01)
  USPC ............................................ 360/314; 360/319

(58) Field of Classification Search
  None
  See application file for complete search history.

(56) References Cited

U.S. PATENT DOCUMENTS

| | | | |
|---|---|---|---|
| 7,616,409 B2 * | 11/2009 | Freitag et al. | 360/324.11 |
| 7,770,284 B2 * | 8/2010 | Ohta et al. | 29/603.16 |
| 2003/0151859 A1 * | 8/2003 | Hayashi et al. | 360/324.2 |
| 2005/0164039 A1 * | 7/2005 | Marinero et al. | 428/694 TS |
| 2005/0213263 A1 * | 9/2005 | Gill | 360/324.12 |
| 2005/0276099 A1 * | 12/2005 | Horng et al. | 365/158 |
| 2008/0030908 A1 * | 2/2008 | Kagami et al. | 360/327.3 |
| 2009/0091865 A1 * | 4/2009 | Zhang et al. | 360/324.12 |
| 2009/0325319 A1 * | 12/2009 | Horng et al. | 438/3 |
| 2011/0265325 A1 * | 11/2011 | Zhang et al. | 29/887 |
| 2011/0268992 A1 * | 11/2011 | Zhang et al. | 428/811.1 |

FOREIGN PATENT DOCUMENTS

| | | |
|---|---|---|
| JP | A 8-45035 | 2/1996 |
| JP | A 2000-57531 | 2/2000 |
| JP | A 2002-25010 | 1/2002 |
| JP | A 2002-25012 | 1/2002 |
| JP | A 2002-25014 | 1/2002 |
| JP | A 2003-158313 | 5/2003 |
| JP | A 2005-108355 | 4/2005 |
| JP | A 2008-41675 | 2/2008 |

* cited by examiner

*Primary Examiner* — Kevin Bernatz
(74) *Attorney, Agent, or Firm* — Oliff PLC (57) ABSTRACT

A thin film magnetic head including a magnetoresistive element (MR) having higher reading performance. In manufacturing the thin film magnetic head, after forming an MR element, a pair of magnetic domain controlling layers are formed by stacking a buffer layer, a magnetic bias layer and a first cap layer in this order on both sides, in a track-width direction, of the MR element via an insulating layer, respectively. Then, a second cap layer is formed to cover the upper surface of the MR element and connect the pair of cap-layers. Then, a gap adjustment layer and a top shielding layer are formed to cover the pair of first cap layers and the second cap layer, completing a read head section.

17 Claims, 11 Drawing Sheets

THIN FILM MAGNETIC HEAD, MAGNETIC HEAD SLIDER, HEAD GIMBAL ASSEMBLY, HEAD ARM ASSEMBLY, MAGNETIC DISK DEVICE AND METHOD OF MANUFACTURING THIN FILM MAGNETIC HEAD

BACKGROUND OF THE INVENTION

1. Field of the Invention

The present invention relates to a thin film magnetic head including a magnetoresistive element and a method of manufacturing the same, and also relates to a magnetic head slider, head gimbal assembly, head arm assembly and magnetic disk device including the thin film magnetic head.

2. Description of the Related Art

A thin film magnetic head, which includes a magnetoresistive element (MR element) exhibiting the magnetoresistive effect (MR effect), is widely used for reading out data written on magnetic recording media such as a hard disk. Recently, a thin film magnetic head which includes a giant magnetoresistive element (GMR element) exhibiting the giant magnetoresistive (GMR) effect is more general because of the highly-progressed recording density of the magnetic recording medium. Examples of such GMR element include a spin valve GMR element (SV-GMR element).

This SV-GMR element is configured in such a manner that a magnetic layer in which its magnetization direction is fixed in a given direction (magnetically pinned layer) and a magnetic layer in which its magnetization direction is varied in accordance with an external signal magnetic field applied from outside (magnetically free layer) are stacked via a nonmagnetic interlayer. In particular, those configured to make a read current flow in a direction along a stacking plane of the element during a reading operation is called CIP-GMR element (Current in Plane GMR element). Further, a thin film magnetic head including the CIP-GMR element is called CIP-GMR head. In this configuration, electric resistance (namely, voltage) is varied when the read current is applied in accordance with a relative angle between the magnetization directions of the two magnetic layers (the magnetically pinned layer and the magnetically free layer).

Recently, to comply with further improvement in the recording density, CPP (Current Perpendicular to the Plane)-GMR head, which includes a CPP-GMR element in which the read current flows in a direction orthogonal to the staking plane at the time of reading operation, has been developed. Such CPP-GMR head generally includes a GMR element, a pair of magnetic domain controlling layers that are arranged to face each other in a track-width direction with the GMR element in between via an insulating layer, and a bottom electrode and a top electrode that are arranged to face each other with the GMR element and the pair of magnetic domain controlling layers in between in the stacking direction. The magnetic domain controlling layers control the magnetic domain of a magnetically free layer so to align the magnetic domain of the magnetically free layer to a single domain by applying a bias magnetic field to the magnetically free layer in the GMR elements, thereby stabilization of the magnetization direction is attained. The top and bottom electrodes also serve as top and bottom shielding films. Such CPP-GMR head recognizes advantages in that high power is available when reducing the dimension in a read track width direction compared with the CIP-GMR head. Namely, in the CIP-GMR head, since the read current flows along the in-plane direction, dimensional reduction in the read track width direction results in the narrowing of magnetic sensitive area through which the read current passes, thereby decreasing the amount of voltage changes. On the other hand, since the read current passes in the stacking direction in the CPP-GMR head, the dimensional reduction in the read track width direction does not affect the amount of voltage changes. For this reason, the CPP-GMR head is advantageous compared with the CIP-GMR head in terms of the reduction of track density whose unit is TPI (number of tracks per inch). What is more, since insulating layers are omitted between the CPP-GMR element and top/bottom shielding layers, that allows the reduction, by the thickness of the omitted layers, of the linear recording density, whose unit is BPI (bit per inch), as compared with the CIP-GMR head.

There is also a tunnel MR element (TMR element) which is configured similar to the CPP-GMR element in that the read current flows in a direction orthogonal to the in-plane direction. This TMR element includes an ultra-thin insulating layer called tunnel barrier layer so as to obtain much higher resistance change ratio than that of the above-mentioned CPP-GMR element. For this reason, the thin film magnetic head including the TMR element (TMR head) is highly expected to comply with the further improvement in the recording density.

In the thin film magnetic head including an element such as CPP-GMR element and TMR element, to comply with the further improvement in the linear recording density, it is necessary to improve the read resolution for a reading waveform obtained from a magnetic recording medium. For that purpose, thickness of the GMR element (TMR element) and the pair of magnetic domain controlling layers need to be reduced so that the distance between the top shielding layer and the bottom shielding layer, i.e., the read gap, may be decreased. However, there is a problem that if the thickness of the GMR element (TMR element) and the magnetic domain controlling layers is reduced, the leakage ratio of the bias magnetic fields, which is leaked out from the magnetic domain controlling layers to the top and bottom shielding layers, increases so that it becomes difficult to apply enough bias magnetic field to the magnetically free layer.

Accordingly, as shown in Japanese Patent Application Publication No. 2008-41675 (JP2008-41675A) or Japanese Patent Application Publication No. 08-45035 (JP08-45035A), for example, a thin film magnetic head with a trilaminar magnetic domain controlling layer, in which a magnetic bias layer typically made of a ferromagnetic material such as cobalt platinum alloy (CoPt) is sandwiched between a buffer layer and a cap layer typically made of chromium (Cr), has been proposed. With such configuration, it seems possible for the thin film magnetic head to apply enough bias magnetic field to a magnetically free layer even if the thickness of the magnetic domain controlling layer is reduced, because coercive force naturally held in the magnetic domain controlling layer can be kept with little leakage.

SUMMARY OF THE INVENTION

Figure 10:
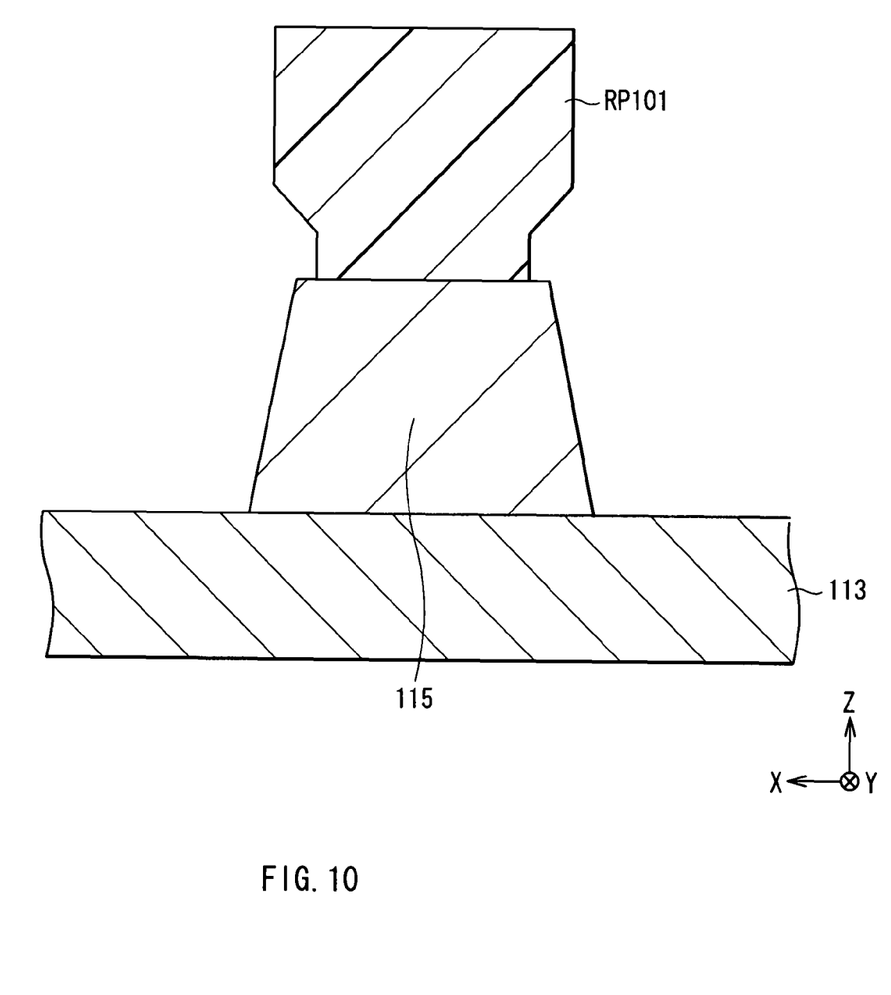
FIG. 10 is a principal portion sectional view showing one production process in the method of manufacturing a thin film magnetic head provided with a read head section of related arts.
Figure 11:
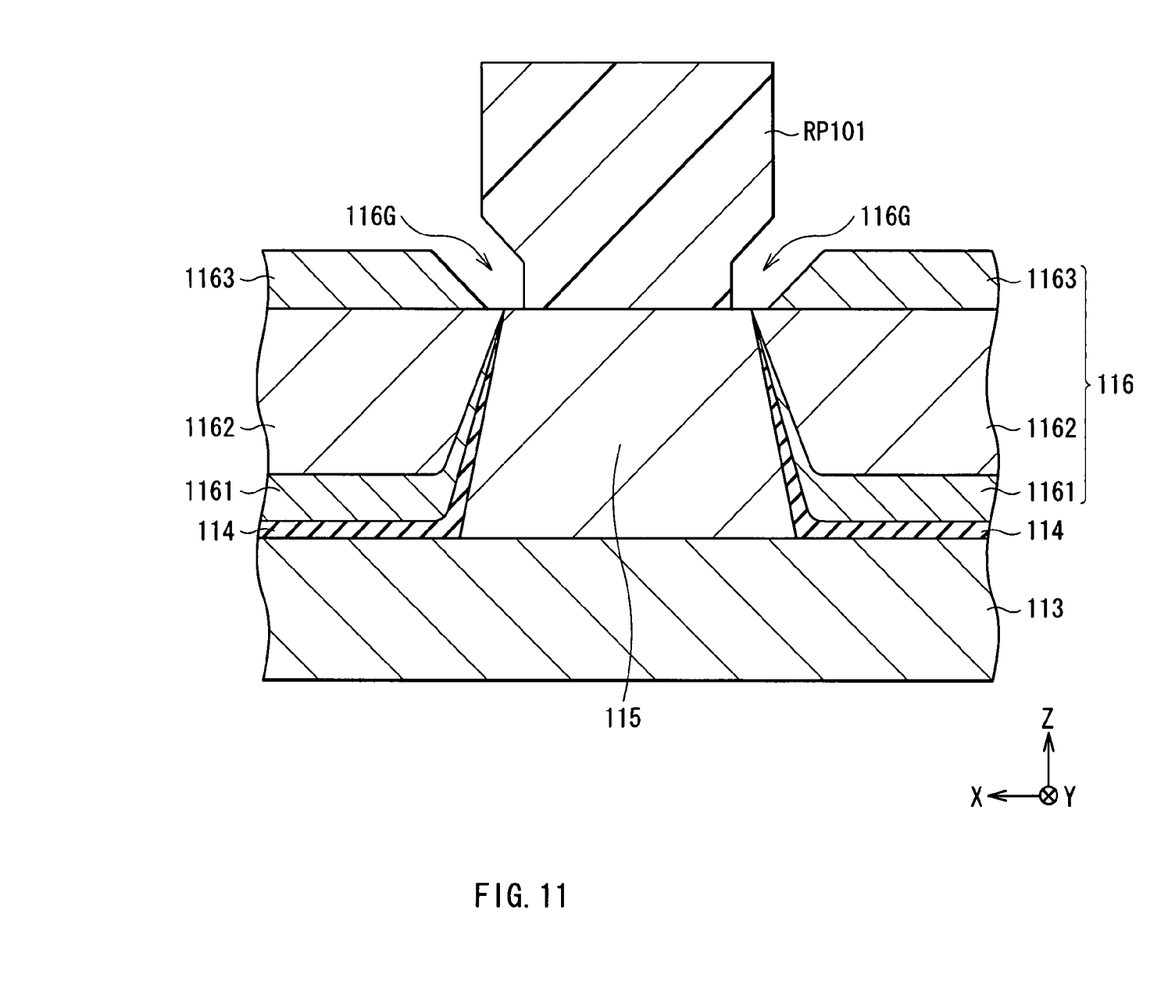
FIG. 11 is a principal portion sectional view of a process subsequent to FIG. 10.
Figure 12:
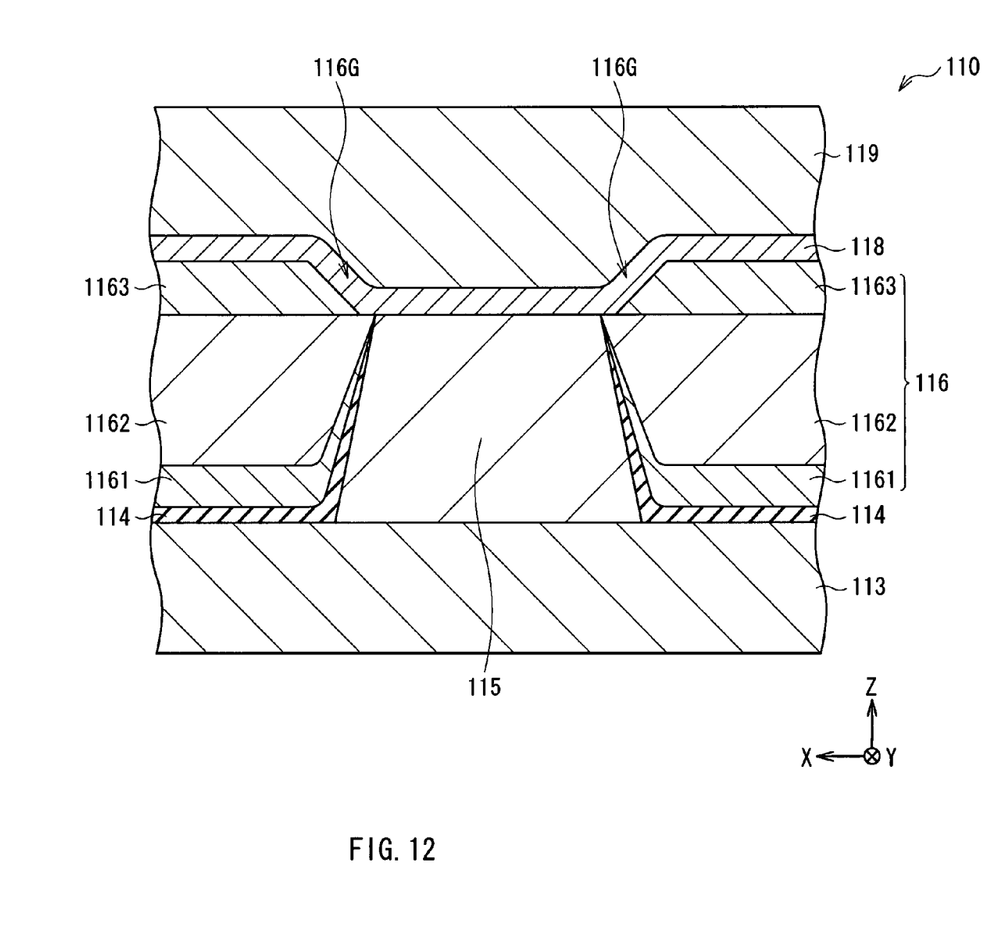
FIG. 12 is a principal portion sectional view of a process subsequent to FIG. 11.

However, when manufacturing the thin film magnetic head having a configuration of the above-mentioned Japanese Patent Application Publication No. 2008-41675 (JP2008-41675A) and Japanese Patent Application Publication No. 08-45035 (JP08-45035A), in practice, it often happens that the thickness of the cap layer which covers the magnetic bias layer in the magnetic domain controlling layer is not enough at an end thereof closer to the GMR element (TMR element). The concrete description of manufacturing the same is as follows. First, as shown in FIG. 10, after forming a GMR element (TMR element) 115 selectively on a bottom magnetic shielding layer 113 using a photoresist pattern RP101, then, as shown in FIG. 11, an insulating layer 114, a buffer layer 1161, a magnetic bias layer 1162, and a cap layer 1163 are stacked in order by sputtering or the like on both sides of the GMR element (TMR element) 115. In this manner, deposition amount of the cap layer 1163 lacks particularly in a region close to the GMR element (TMR element) 115 because of the presence of the photoresist pattern RP101, so it is liable to produce a gap 116G between the GMR element (TMR element) 115 and the cap layer 1163. With such configuration, the upper surface of the magnetic bias layer 1162 is partially exposed. Accordingly, when a gap adjustment layer 118 and a top magnetic shielding layer 119 are stacked in order after removing the photoresist pattern RP101 so as to cover the whole plane as shown in FIG. 12, the gap adjustment layer 118 is directly in contact with the upper surface of the magnetic bias layer 1162 in the region of the gap 116G. Here, the gap adjustment layer 118 is a metal layer for appropriately adjusting the distance between the GMR element (TMR element) 115 and the top magnetic shielding layer 119. Then, when crystal lattice compatibility is not good between materials respectively forming the ferromagnetic layer 1162 of the magnetic domain controlling layer and the gap adjustment layer 118, the crystal structure of the magnetic bias layer 1162 changes around the interface with the gap adjustment layer 118, thereby the coercive force naturally held in the ferromagnetic layer 1162 is reduced. Further, since the magnetic bias layer 1162 and the top magnetic shielding layer 119 become close in distance to each other around the gap 116G, it may happen that the bias magnetic field from the magnetic bias layer 1162 may be leaked out to the top magnetic shielding layer 119, thereby leading to a shortage of bias magnetic field necessary for controlling the magnetic domain of a magnetically free layer.

Further, since there is a difference between the height of the upper surface of the GMR element (TMR element) 115 and the height of the cap layer covering the ferromagnetic layer 1162, the surface of the gap adjustment layer 118 covering the whole surface is not smooth and the undersurface of the top magnetic shielding layer 119 becomes bumpy, thereby there may be a harmful influence on the reading characteristics as a thin film magnetic head. Accordingly, it is required of a thin film magnetic head to have more excellent read resolution in order to comply with higher recording density and to have more stable reading operation.

The present invention has been devised in view of the above problems, and it is desirable to provide a thin film magnetic head, a magnetic head slider, head gimbal assembly, head arm assembly and a magnetic disk device having more excellent reading performance.

It is also desirable to provide a method of manufacturing a thin film magnetic head, in which a thin film magnetic head having more excellent reading performance can be made more simply and with much certainty.

A thin film magnetic head of an embodiment of the present invention comprises the following component elements from (A1) to (A5).

(A1): a magnetoresistive element having a recording-medium-facing-surface facing a magnetic recording medium and detecting a signal magnetic field applied from the magnetic recording medium;

(A2): a pair of magnetic bias layers disposed on both sides, in a track-width direction of the magnetic recording medium, of the magnetoresistive element, and applying a bias magnetic field to the magnetoresistive element;

(A3): a bottom magnetic shielding layer and a top magnetic shielding layer both exposed to the recording-medium-facing-surface, and sandwich the magnetoresistive element and the pair of magnetic bias layers in a stacking direction orthogonal to the track-width direction;

(A4): a pair of first cap layers provided between the pair of magnetic bias layers and the top magnetic shielding layer so as to cover the pair of magnetic bias layers; and (A5): a second cap layer provided between the magnetoresistive element and the top magnetic shielding layer so as to cover an upper surface of the magnetoresistive element and to be in contact with the pair of first cap layers.

Here, the pair of first cap layers extend so that at least a part of upper surfaces thereof may be located at a same height in the thickness direction, the height being same as or higher than an upper surface of the second cap layer.

Further, a magnetic head slider, a head gimbal assembly, a head arm assembly, and a magnetic disk device of an embodiment of the present invention are all configured to include the above-mentioned thin film magnetic head of an embodiment of the present invention.

According to an embodiment of the present invention, there is provided a method of manufacturing a thin film magnetic head including a magnetoresistive element, the magnetoresistive element having a recording-medium-facing-surface facing a magnetic recording medium and detecting a signal magnetic field applied from the magnetic recording medium, the method including the following steps of (B1) to (B6).

(B1): forming a bottom magnetic shielding layer on a substrate;

(B2): forming a magnetoresistive film on the bottom magnetic shielding layer;

(B3): forming a mask pattern so as to selectively cover the magnetoresistive film, then selectively removing the magnetoresistive film using the mask pattern, thereby completing the magnetoresistive element;

(B4): forming a pair of insulating layers which continuously cover both side-faces, in a track-width direction of the magnetic recording medium, of the magnetoresistive element and a region of the bottom magnetic shielding layer where the magnetoresistive film was removed, then stacking a pair of magnetic bias layers and a pair of first cap layers on the pair of insulating layers so as to sandwich the magnetoresistive element in the track-width direction;

(B5): removing the mask pattern, then forming a second cap layer so as to cover an upper surface of the magnetoresistive element and to be in contact with the pair of first cap layers; and (B6): forming a top magnetic shielding layer on the first and second cap-layers in a region corresponding to the bottom magnetic shielding layer.

Here, the pair of first cap layers are formed so that at least a part of upper surfaces thereof may be located at a same height in the thickness direction, the height being same as or higher than an upper surface of the second cap layer.

In the thin film magnetic head and method of manufacturing the same according to the present invention, since the second cap layer is provided so as to fill the gap between the pair of first cap layers, which are disposed on the pair of magnetic bias layers located on both sides of the magnetoresistive element, the upper surface of the pair of magnetic bias layers are in contact only with the first and second cap layers. Accordingly, if the first and second cap layers are made of a material excellent in crystal lattice compatibility with the magnetic bias layer, the coercive force of the magnetic bias layer can be increased. What is more, since the pair of first cap layers are located so that at least a part of upper surfaces thereof may be located at a same height in the thickness direction, the height being same as or higher than an upper surface of the second cap layer, roughness of the undersurface of the top magnetic shielding layer due to the height difference in the upper surface plane between the MR element and the first cap layer can be improved. That allows the top magnetic shielding layer to exhibit enough shielding effect for protecting the MR element from unnecessary external magnetic fields other than a specified signal magnetic field. As a result, it becomes possible to comply with a magnetic recording medium with higher recording density and to secure stability of reading operation.

In the thin film magnetic head and method of manufacturing the same according to the present invention, it is more preferable if the upper surfaces of the pair of first cap layers and the second cap layer are aligned to form a common planar surface. That is because such configuration makes it possible to more planarize the undersurface of the top magnetic shielding layer, therefore allowing a higher exhibition of the shielding effect.

In the thin film magnetic head and method of manufacturing the same according to the present invention, the gap adjustment layer may be further disposed for covering both of the pair of first cap layers and the second cap layer so that the read gap may be optimized, the gap between the magnetically free layer and the top magnetic shielding layer included in the magnetoresistive element may be optimized, and the surface planarization of the undersurface (on the side near the magnetoresistive element) of the top magnetic shielding layer may be improved. The second cap layer and the gap adjustment layer may be formed into one unit. Namely, the second cap layer may serve as the gap adjustment layer. With such configuration, not only the structure but also its manufacturing process are more simplified.

In the thin film magnetic head and method of manufacturing the same according to the present invention, it is desirable if the pair of magnetic bias layers are made of cobalt platinum alloy, and the pair of first cap layers and the second cap layer are made of chromium. It is further desirable if the pair of magnetic bias layers are disposed upon and in contact with the pair of buffer layers of chromium. With such configuration, a bias magnetic field from the magnetic bias layer can be more enhanced, thereby increasing the stability of reading operation.

Other objects, features and effects of the present invention will be explained as necessary in the following descriptions.

DETAILED DESCRIPTION OF THE PREFERRED EMBODIMENTS

Embodiments of the present invention will be described in detail hereinbelow with reference to the drawings. First, configuration and operation of a thin film magnetic head according to an embodiment of the present invention and a magnetic head slider, head gimbal assembly, head arm assembly and magnetic disk device including the thin film magnetic head will be described hereinbelow with reference to FIGS. 1 to 7.

Figure 1:
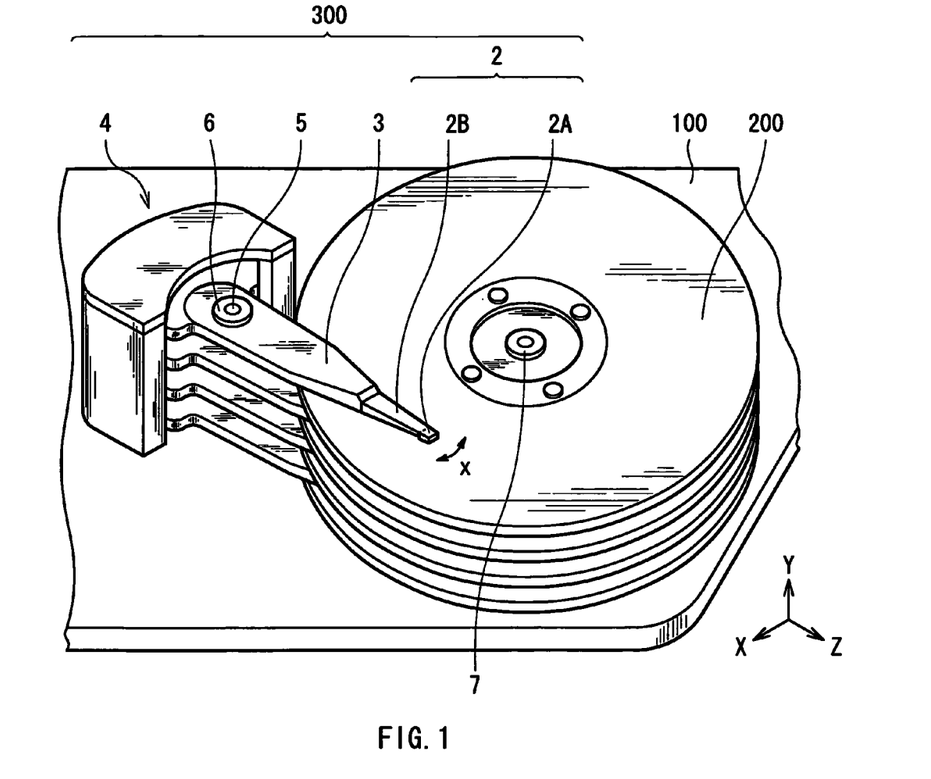
FIG. 1 is a perspective view showing a configuration of an actuator arm that includes a thin film magnetic head according to an embodiment of the present invention.

FIG. 1 is a perspective view showing an internal configuration of the magnetic disk device according to an embodiment of the present embodiment. The magnetic disk device includes, inside a housing 100 for example, a magnetic recording medium 200 that works as a magnetic recording medium on which data is written, and a head arm assembly (HAA) 300 which writes data onto the magnetic recording medium 200 and reads it out as shown in FIG. 1. The HAA 300 includes a head gimbal assembly (HGA) 2, an arm 3 supporting the base portion of the HGA 2, and an actuator 4 that works as a power source for rotating the arm 3. The HGA 2 includes a magnetic head slider 2A (hereinafter referred to as "slider") having an after-mentioned thin film magnetic head 1 of the present embodiment on one side-face thereof, and a suspension 2B having the slider 2A attached to one end thereof. The other end (on a side opposite to the slider 2A) of the suspension 2B is supported by the arm 3. The arm 3 is configured to rotate about a fixed axle 5 which is fixed to the housing 100 via a bearing 6. The actuator 4 is typically constituted from a voice coil motor. Usually, the magnetic disk device includes a plurality of magnetic recording media 200 and a plurality of the sliders 2A are arranged corresponding to recording surfaces (upper surface and rear surface) of the respective magnetic recording media 200 as shown in FIG. 1. Each of the sliders 2A is movable in a direction across the read track (the X-axial direction) on a plane parallel to the recording surface of the respective magnetic write media 200. Meanwhile, the magnetic recording medium 200 rotates around a spindle motor 7 which is fixed to the housing 100, in a direction approximately orthogonal to the X-axial direction. Thus data is written on the magnetic recording medium 200 and read out by rotation of the magnetic recording medium 200 and transverse motion of the slider 2A.

Figure 2:
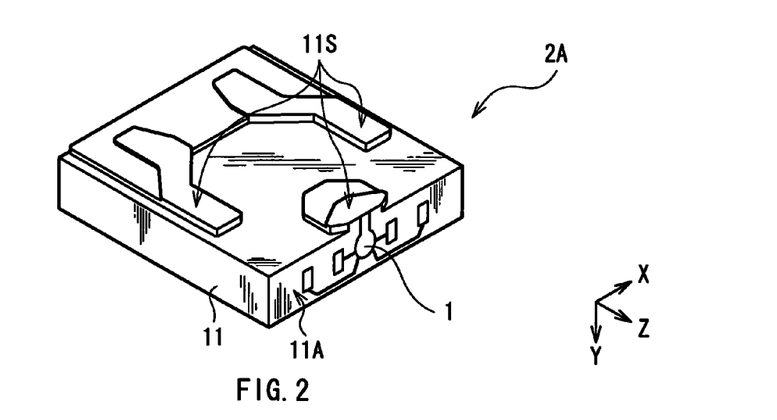
FIG. 2 is a perspective view showing a configuration of a slider in the actuator arm appearing in FIG. 1.

FIG. 2 shows a configuration of the slider 2A appearing in FIG. 1. This slider 2A includes a block-shaped substrate 11, which is made of altics ($Al_2O_3$.TiC), for example. The substrate 11 is approximately hexahedral in shape, for example, and is arranged so that one side face thereof is closely opposed to the recording surface of the magnetic recording medium 200. The side face opposed to the recording surface of the magnetic recording medium 200 is called recording-medium-facing-surface 11S, which is also called air bearing surface (ABS). When the magnetic recording medium 200 rotates, the slider 2A floats from the recording surface in a direction away from the recording surface (the Y-axis direction) by lift caused by the airflow between the recording surface and the recording-medium-facing-surface 11S so that there is a specified gap between the recording-medium-facing-surface 11S and the magnetic recording medium 200. A thin film magnetic head 1 is disposed on an element formation face 11A which is one of the side-faces of the substrate 11 as with the recording-medium-facing-surface 11S.

Figure 3:
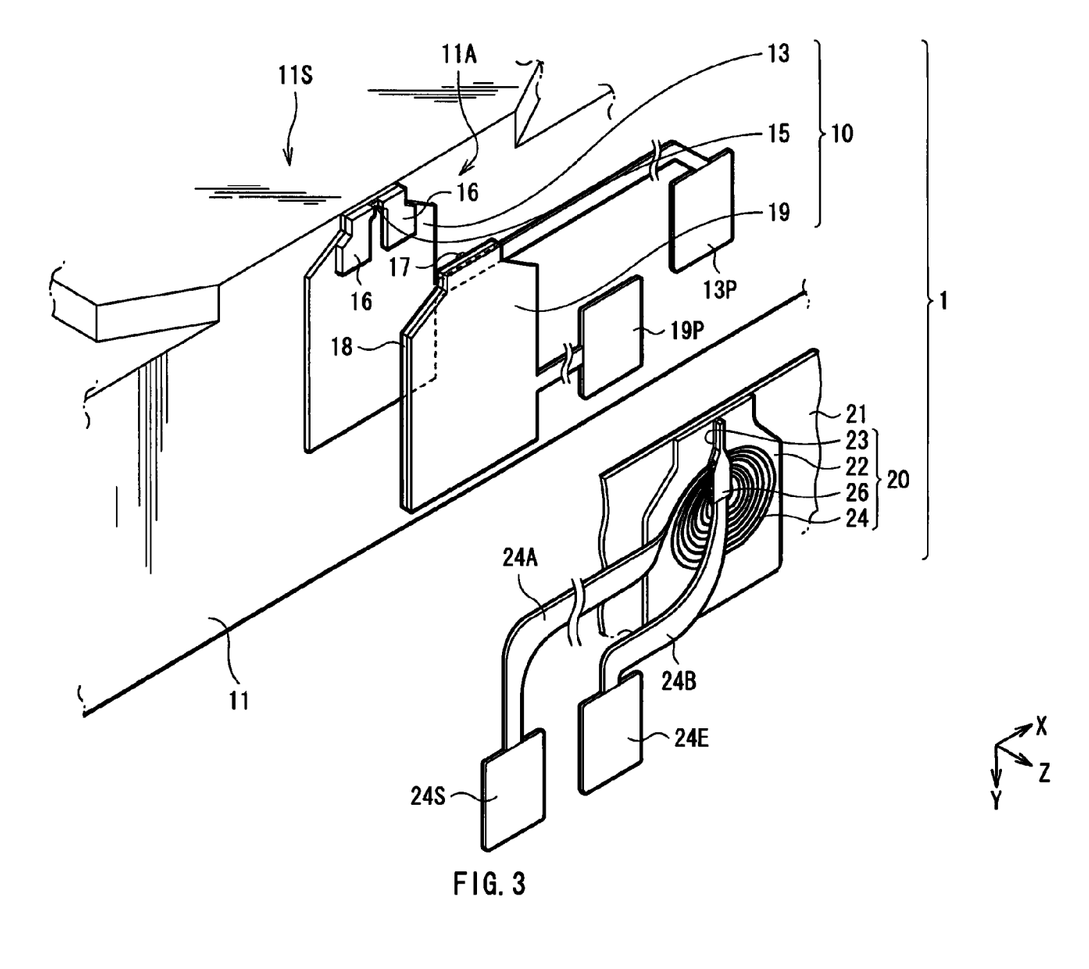
FIG. 3 is an exploded perspective view showing a configuration of the thin film magnetic head appearing in FIG. 1.
Figure 4:
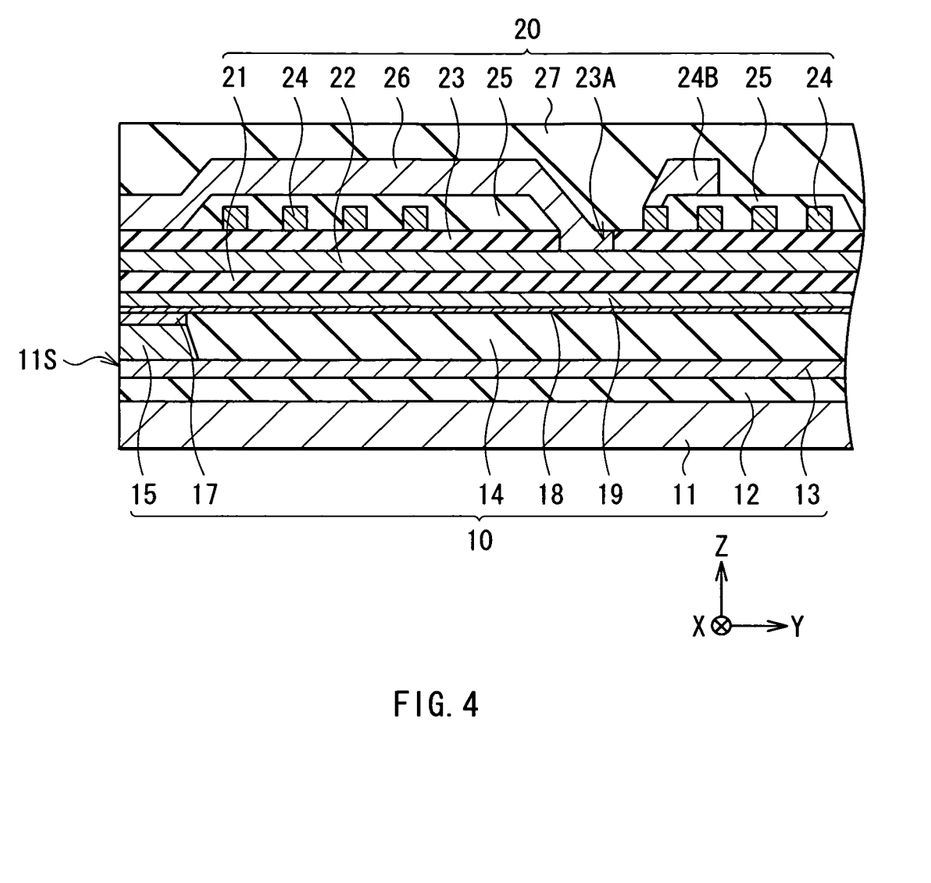
FIG. 4 is a sectional view showing a configuration of the cross section of the thin film magnetic head shown in FIG. 1, which is orthogonal to the recording-medium-facing-surface and passes through a magnetoresistive element.

FIG. 3 is an exploded perspective view showing a disassembled configuration of the thin film magnetic head 1. FIG. 4 is a sectional view showing a configuration of the cross section of the thin film magnetic head 1, which is orthogonal to the recording-medium-facing-surface 11S and passes through a magnetoresistive element 15 (which will be described later). As shown in FIGS. 3 and 4, the thin film magnetic head 1 is integrally constituted from a read head section 10 which reads magnetic information written on the magnetic recording medium 200 and a record head section 20 which writes magnetic information on a write track of the magnetic recording medium 200.

Figure 5:
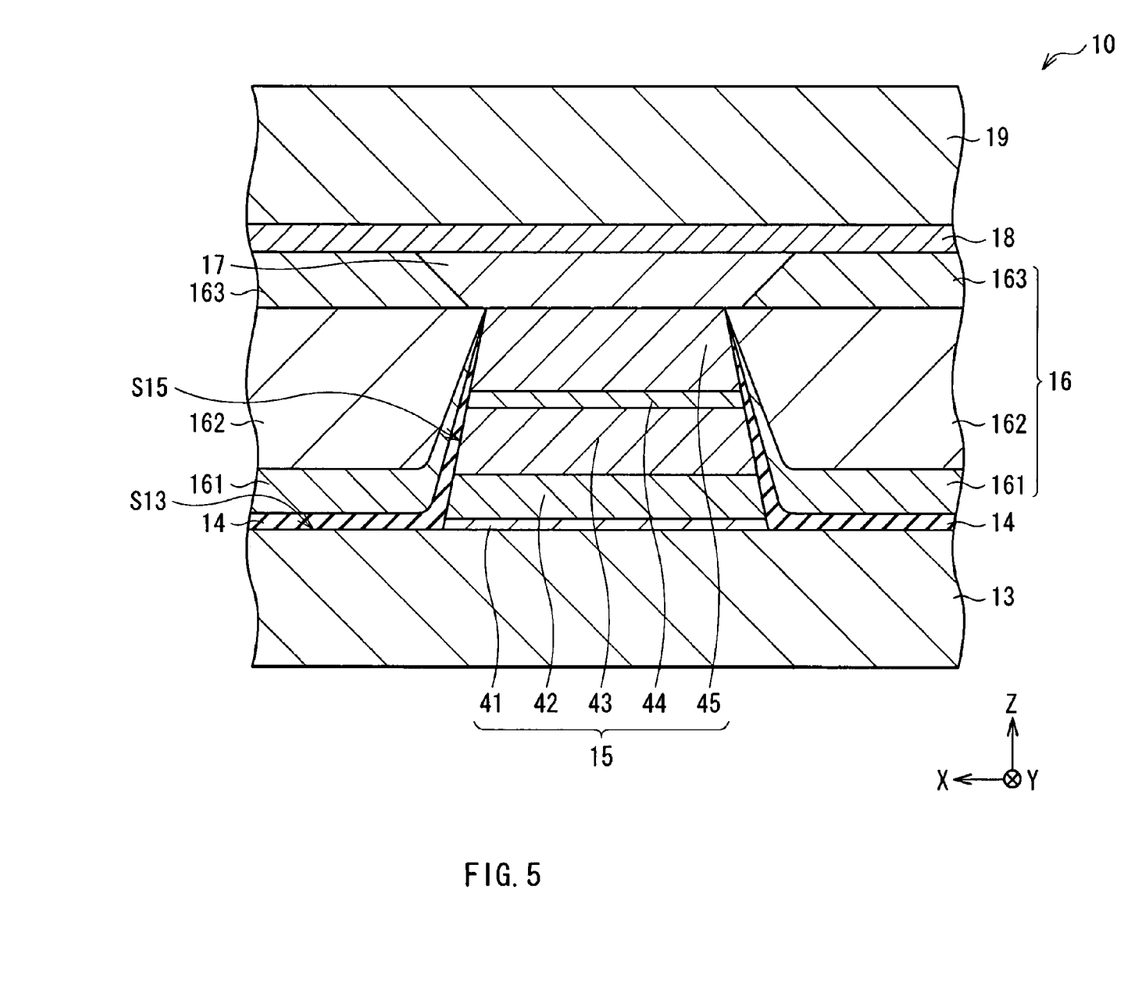
FIG. 5 is an enlarged cross section showing a principal structure of the read head section shown in FIG. 3, which is parallel to the recording-medium-facing-surface.

FIG. 5 is an enlarged cross section showing a principal structure of the read head section 10, which is parallel to the recording-medium-facing-surface 11S. As shown in FIGS. 3 to 5, the read head section 1A includes a magnetoresistive element (hereinafter referred to as MR element) 15 having the CPP (Current Perpendicular to the Plane) structure, in which sensing current flows in a stacking direction of MR layers. Specifically, a bottom shielding layer 13, the MR element 15, a gap adjustment layer 18, and a top shielding layer 19 are stacked in order via an insulating layer 12 on the substrate 11, for example. A cap layer 17 is disposed between the MR element 15 and the gap adjustment layer 18. A pair of magnetic domain controlling layers 16 which give a bias magnetic field to the MR element 15 are disposed on both sides, in the track-width direction (X axial direction) of the magnetic recording medium 200, of the MR element 15 via an insulating layer 14. The insulating layer 14 continuously covers from an upper surface S13 of the bottom shielding layer 13 to the both side-faces S15, in the track-width direction, of the MR element 15. The insulating layer 14 further occupies a space corresponding to the MR element 15 in the rear portion of the MR element 15 (opposite to the recording-medium-facing-surface 11S) so that an electrical path for sensing current may be specified correctly and the sensing current may be prevented from leaking out of the MR element 15 (refer to FIGS. 4 and 5).

The bottom shielding layer 13 and the top shielding layer 19 are formed to the thickness of 0.03 to 3 μm respectively, and made of a soft magnetic metal material such as nickel iron alloy (NiFe), for example. These bottom shielding layer 13 and top shield layer 19 are opposed to each other with the MR element 15 in between in the stacking direction (the direction of Z) so as to prevent the MR element 15 from being affected by unnecessary magnetic fields. The bottom shielding layer 13 is connected to a pad 13P and the top shielding layer 19 is connected to a pad 19P so as to function as electrodes for applying current to the MR element 15 in the stacking direction (the direction of Z).

The MR element 15, which is structured in such a manner that many metal membranes containing a magnetic material are stacked as shown in FIG. 5, functions as a sensor to read magnetic information written on the magnetic recording medium 200. Specifically, a foundation layer 41, an antiferromagnetic layer 42, a magnetically pinned layer 43, an intervening layer 44, and a magnetically free layer 45 are stacked in order from the side of the bottom shielding layer 13. The foundation layer (also referred to as buffer layer) 41 typically has a structure in which a tantalum (Ta) layer and a ruthenium (Ru) layer are stacked in order from the side of the bottom shielding layer 13. The foundation layer 41 functions to support exchange coupling between the antiferromagnetic layer 42 and the magnetically pinned layer 43. The antiferromagnetic layer 42 is typically made of an antiferromagnetic material such as platinum manganese alloy (PtMn) or iridium manganese alloy (IrMn). The antiferromagnetic layer 42 functions as what is called a pinning layer that fixes the magnetization direction of the magnetically pinned layer 43. The magnetically pinned layer 43, which is called pinned layer, is typically made of a ferromagnetic material such as cobalt iron alloy (CoFe) and its magnetization direction is pinned by the antiferromagnetic layer 42. The magnetically pinned layer 43 may have a single layer structure, or may have trilaminar structure what is called synthetic structure.

The intervening layer 44 is made of a nonmagnetic metal material which has comparatively high electric conductivity (electric resistance is small), and may have either a single layer structure or multilayer structure. The intervening layer mainly functions to turn off the magnetic coupling between the magnetically free layer and the magnetically pinned layer 43. Alternatively, the intervening layer 44 may be made of an electrical insulating material such as magnesium oxide (MgO), which is very thin in thickness. In such configuration, the intervening layer 44 functions as a tunnel barrier layer.

The magnetically free layer 45 can vary its magnetization direction in accordance with a signal magnetic field applied from the magnetic recording medium 200, and may have a single layer structure or multilayer structure containing a ferromagnetic material, such as nickel iron alloy (NiFe) and cobalt iron alloy (CoFe).

The pair of magnetic domain controlling layers 16 have a trilaminar structure in which a buffer layer 161, a magnetic bias layer 162, and a cap layer 163 are stacked in order on the insulating layer 14, and is electrically insulated from the MR element 15, the bottom shielding layer 13 and the top shielding layer 19 due to the surrounding insulating layer 14. The buffer layer 161, which is made of any of a simple substance chromium, a chromium titanium alloy (CrTi) or a simple substance tantalum, for example, and functions to promote crystal growth of the magnetic bias layer 162 in the manufacturing process, and improve lattice matching with the component material of the magnetic bias layer 162 so as to raise the coercive force of the magnetic bias layer 162. The magnetic bias layer 162 may be a single layer structure typically made of a ferromagnetic material containing cobalt, such as cobalt platinum alloy (CoPt) and cobalt chrome platinum alloy (CoCrPt), or may be a multilayer structure including a layer made of such ferromagnetic materials. It functions to control the magnetic domain structures of the magnetically free layer 45 by applying a bias magnetic field to the magnetically free layer 45 in the track-width direction. The cap layer 163 which covers the magnetic bias layer 162 is made of a material which is excellent in lattice matching with CoPt or CoCrPt and promotes crystallization of the magnetic bias layer 162, such as chromium, CrTi, chromium molybdenum alloy (CrMo), chromium tungsten alloy (CrW), titanium tungsten alloy (TiW), tungsten (W), ruthenium (Ru), ruthenium chromium alloy (RuCr), and platinum chromium alloy (PtCr). Here, in the thin film magnetic head 1, the upper surface of the magnetic bias layer 162 is aligned to the upper surface of the MR element 15, and the upper surface of the cap layer 163 is located closer to the top shielding layer 19 than the upper surface of the MR element 15, so that a space area occupied by the magnetic bias layer 162 may be enlarged to increase the magnitude of the bias magnetic field applied to the MR element 15.

The cap layer 17 is a metal layer provided so as to cover the upper surface of the MR element 15 and connect the pair of cap layers 163. When the magnetic bias layer 162 is made of a ferromagnetic material containing cobalt, such as CoPt and CoCrPt, it is preferred that the cap layer 17 is made of the same kind of material as the above-mentioned cap layer 163, i.e., chromium, CrTi, CrMo, CrW, TiW, tungsten, ruthenium, RuCr, PtCr, etc. It is more preferable if the upper surface of the cap layer 17 and the upper surface of the cap layer 163 are aligned to form a common planar surface. That is because the surface smoothness of the gap adjustment layer 18, which covers the cap layer 17 and the cap layer 163, is thus enhanced, thereby more improving the lower-surface planarization of the top shielding layer 19. As a result, more excellent shielding effect is available.

The gap adjustment layer 18 covers both of the pair of cap layers 163 and the cap layer 17 and is typically made of a nonmagnetic substance of high conductivity, such as ruthenium and tantalum. The gap adjustment layer 18 can be used to optimize a read gap, optimize a gap between the magnetically free layer 45 and the top shielding layer 19, or further improve the surface smoothness of the undersurface of the top shielding layer 19 (on the side near the MR element 15).

Next, the reading operation of the read head section 10 will be described hereinbelow. The read head section 10 reads out information written on the magnetic recording medium 200 based on the phenomenon that the electric resistance of the MR element 15 varies in accordance with a signal magnetic field applied from the magnetic recording medium 200.

When the read head section 10 reads out information, a sensing current is first applied to the MR element 15 via the bottom shielding layer 13 and the top shielding layer 19 in the stacking direction (the direction of Z). Namely, a sensing current is applied inside the MR element 15 from the foundation layer 41 through the antiferromagnetic layer 42, the magnetically pinned layer 43, the intervening layer 44 and the magnetically free layer 45 in this order or vice versa. Here, when the signal magnetic field from the magnetic recording medium 200 is applied, the magnetization direction of the magnetically free layer 45 rotates in accordance with the direction and magnitude of the signal magnetic field while the magnetization of the magnetically pinned layer 43 is fixed to a certain direction by the antiferromagnetic layer 42. Accordingly, relative direction of magnetizations between the magnetically free layer 45 and the magnetically pinned layer 43 is changed. Such variation in magnetization states in accordance with the variation of signal magnetic fields causes a change in the spin-dependent scattering of conduction electrons in a sensing current passing through the MR element 15 in its stacking direction, resulting in a change of the resistance of the MR element 15. Since such variation of resistance brings about variation of output voltage, it becomes possible to read out the information written on the magnetic recording medium 200 by detecting the current variation.

Next, configuration of the write head section 20 will be described. As shown in FIGS. 3 and 4, the write head section 20 is formed on the read head section 10 via an insulating layer 21, and includes a lower magnetic pole 22, a write gap layer 23, a coil 24, an insulating layer 25 and an upper magnetic pole 26.

The lower magnetic pole 22 is typically made of a magnetic material such as NiFe, and is formed on the insulating layer 21. The write gap layer 23 is made of an electrical insulating material such as $Al_2O_3$ and is formed on the lower magnetic pole 22. The write gap layer 23 has an opening 23A in a portion opposed to the center, on the X-Y plane, of the coil 24 to form a magnetic path. The coil 24 is windingly disposed on the write gap layer 23 with the center of the winding aligned to the center of the opening 23A, and is typically made of copper (Cu) or gold (Au). Most portion of the coil 24, except its end portions, is covered with the insulating layer 25 made of photoresist or the like. Both ends of the coil 24 are connected to electrodes 24S and 24E via coil leads 24A and 24B, respectively. Further, the upper magnetic pole 26 is formed to cover the write gap layer 23, the opening 23A and the insulating layer 25. The upper magnetic pole 26 is made of a soft magnetic material having a high saturation magnetic flux density, such as NiFe for example, and is in contact with the lower magnetic pole 22 via the opening 23A so as to be magnetically connected each other. A protective film 27 which is made of an electrical insulating material, such as $Al_2O_3$ covers the whole of the upper surface of the write head section 20.

In the write head section 20 with such configuration, magnetic flux is generated in the magnetic path, which is mainly constituted from the lower magnetic pole 22 and the upper magnetic pole 26 when the write current is applied in the coil 24. With such magnetic flux, a signal magnetic field is generated around the write gap layer 23, thereby magnetizing a specified region of the magnetic recording medium 200 to write data thereon.

Next, a method of manufacturing the thin film magnetic head 1 will be described as one embodiment of the present invention.

Here, a method of manufacturing the read head section 10 will be explained first with reference to FIGS. 6 to 9. FIGS. 6 to 9 are principal portion sectional views in which one production process in the method of manufacturing the read head section 10 is shown. First, after forming the insulating layer 12 on the substrate 11 by a sputtering process etc., so as to cover the whole surface thereof, the bottom shielding layer 13 is selectively formed on the insulating layer 12 by a frame plating process or the like so as to include an area on which the MR element 15 will be finally formed. Examples of the component material for the bottom shielding layer 13 include not only NiFe but also cobalt iron nickel alloy (CoFeNi), cobalt iron alloy (CoFe), iron nitride (FeN) and iron zirconium nitride (FeZrN).

Figure 6:
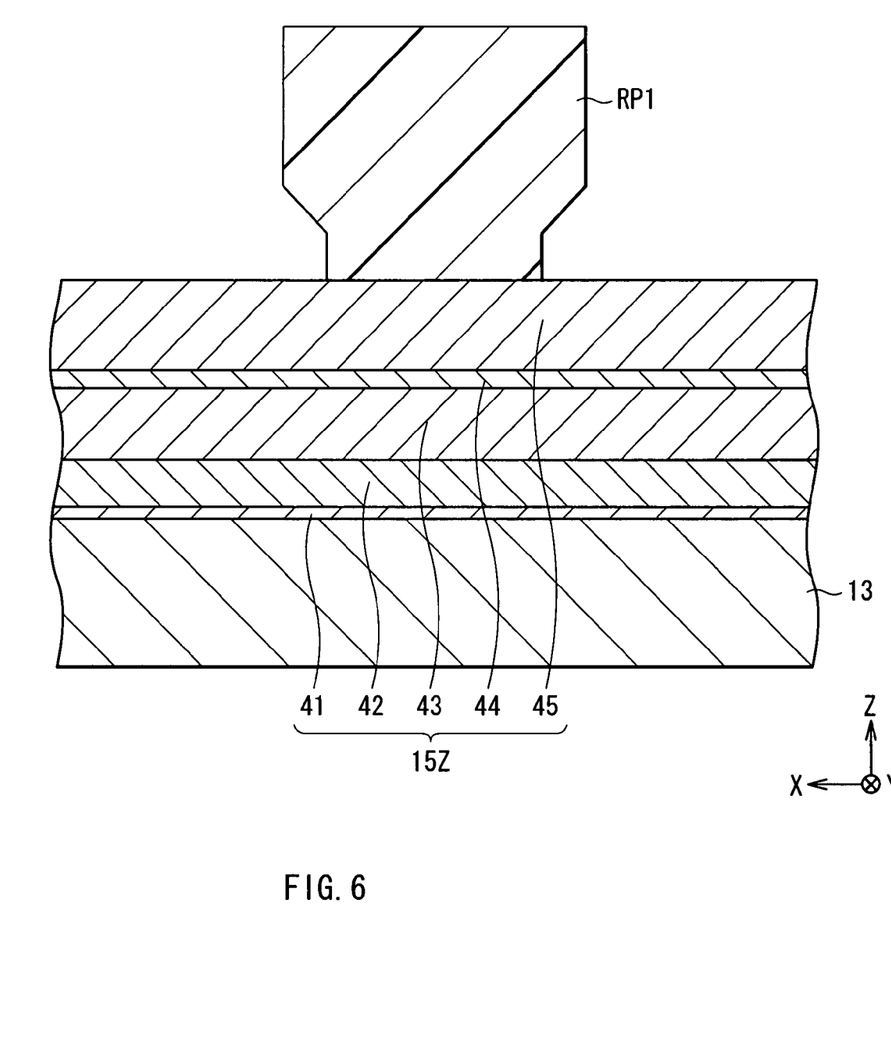
FIG. 6 is a principal portion sectional view showing one production process in the method of manufacturing the thin film magnetic head of FIG. 1.

Subsequently, an MR film 15Z is formed so as to cover the whole surface thereof as shown in FIG. 6. Specifically, the MR film 15Z is formed by stacking the foundation layer 41, the antiferromagnetic layer 42, the magnetically pinned layer 43, the intervening layer 44, and the magnetically free layer 45 in this order by a sputtering process. Then, a photoresist pattern RP1 is selectively formed in a predetermined position on the MR film 15Z by photolithography method etc.

Figure 7:
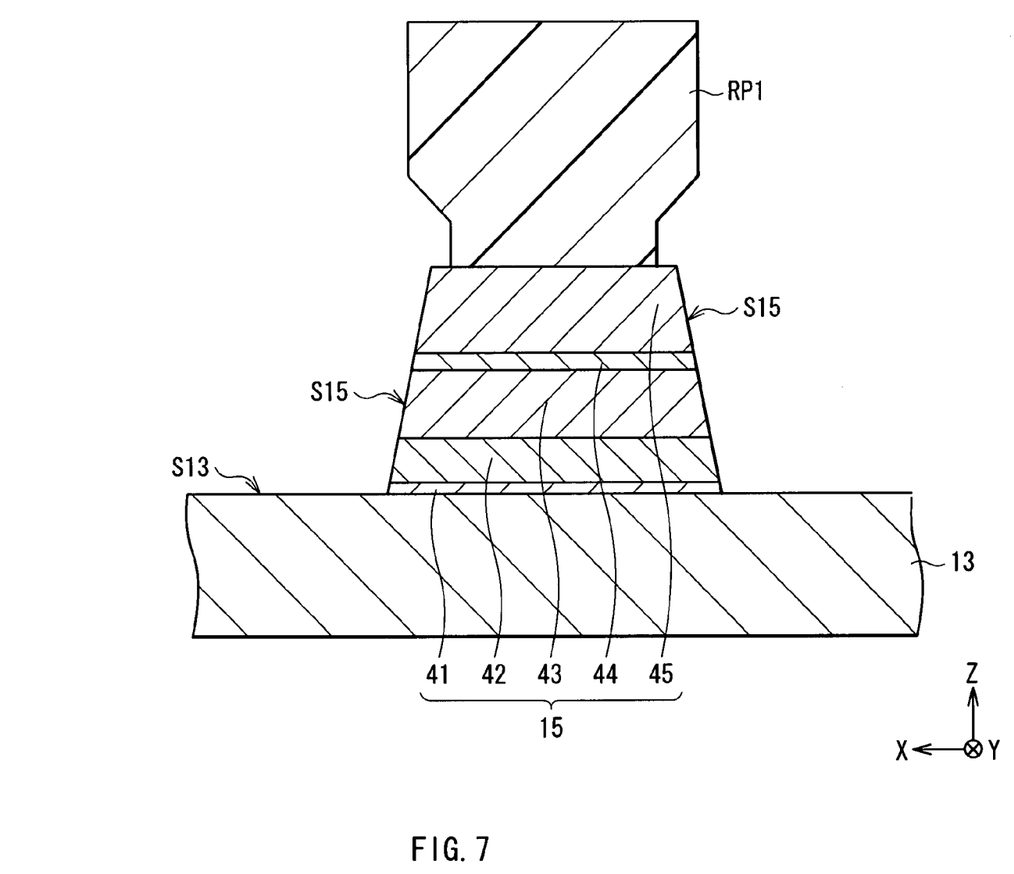
FIG. 7 is a principal portion sectional view of a process subsequent to FIG. 6.

Subsequently, an MR film 15Z is patterned to define the dimension in the track-width direction (the X axial direction) by dry etching process such as ion milling and reactive ion etching (RIE), using a photoresist pattern RP1 as a mask. Here, etching is performed until it reaches the upper surface S13 of the bottom shielding layer 13. As a result, the MR element 15 which includes, in the track-width direction, a pair of side-faces S15 is obtained.

Figure 8:
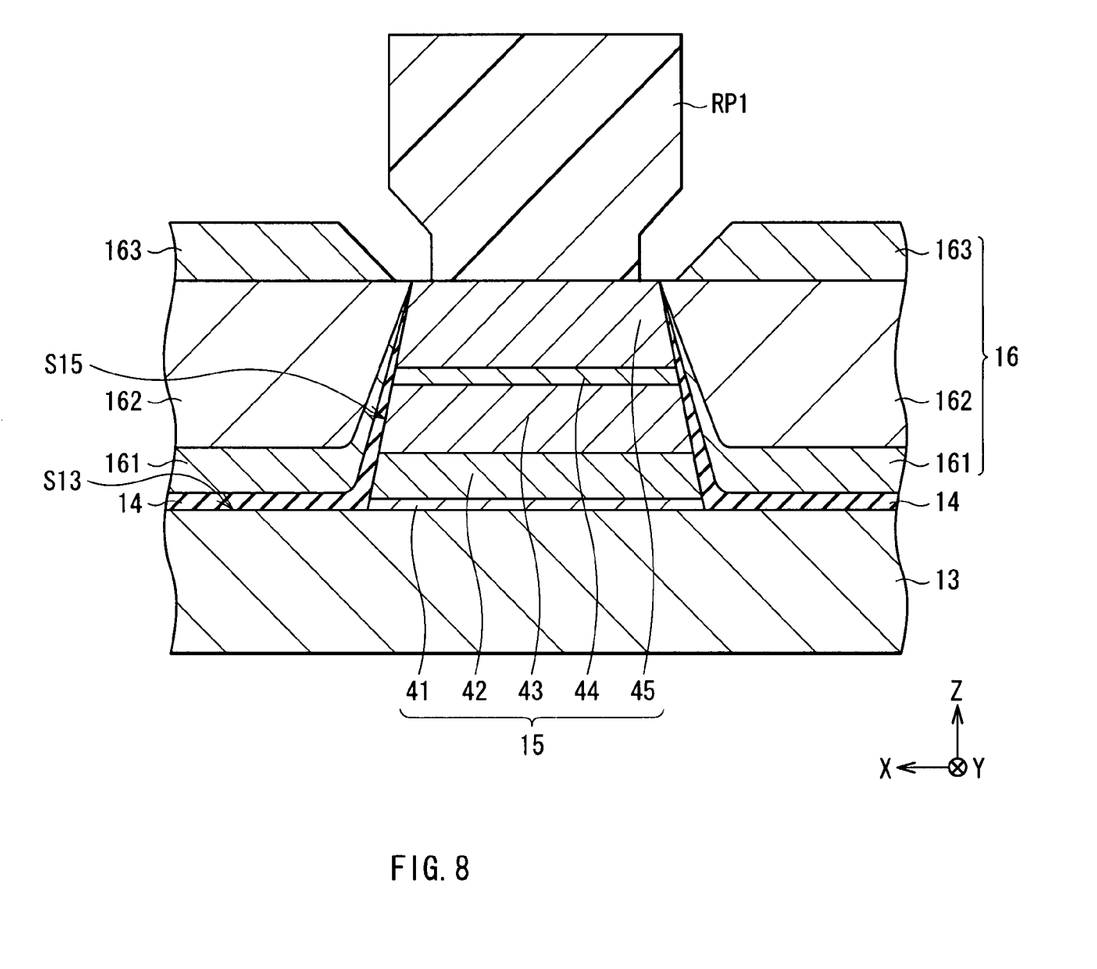
FIG. 8 is a principal portion sectional view of a process subsequent to FIG. 7.

Next, after forming the pair of insulating layers 14 so that the both side-faces S15 of the MR element 15 and a portion of the upper surface S13 of the bottom shielding layer 13 where the MR film 15Z was removed may be covered continuously, the buffer layer 161, the magnetic bias layer 162, and the cap layer 163 are stacked in this order on the insulating layer 14 respectively using the above-mentioned materials so that the MR element 15 may be sandwiched therewith in the track-width direction. As a result, the pair of magnetic domain controlling layers 16 are completed (FIG. 8).

Figure 9:
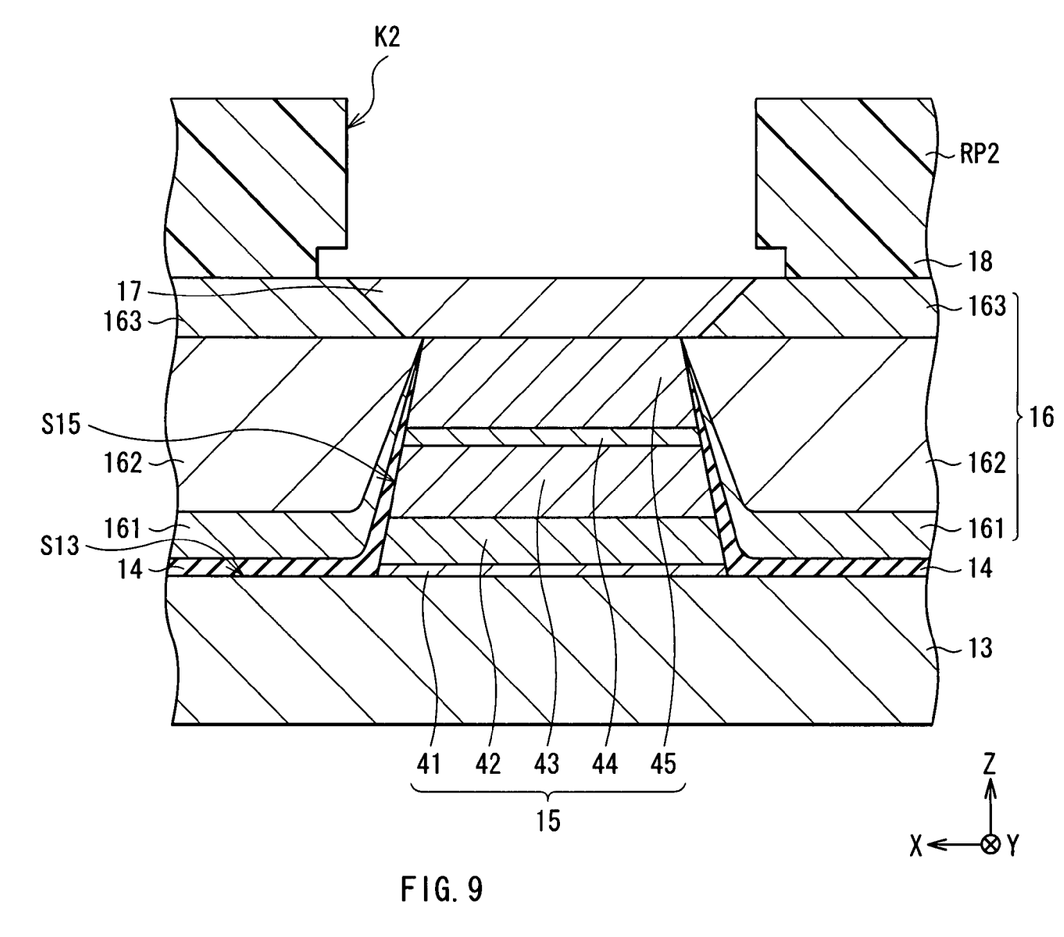
FIG. 9 is a principal portion sectional view of a process subsequent to FIG. 8.

Further, as shown in FIG. 9, after removing the photoresist pattern RP1, a photoresist pattern RP2 which has an opening K2 is formed in a region corresponding to the MR element 15. Subsequently, the cap layer 17 is formed between the pair of cap layers 163 so as to cover the upper surface of the MR element 15 and connect the pair of cap-layers 163 by a sputtering process or the like, in which the photoresist pattern RP2 is used as a mask. Finally, after removing the photoresist pattern RP2, the gap adjustment layer 18 is formed so as to cover both of the cap layers 163 and the cap layer 17. Then, the top shielding layer 19 is formed on the gap adjustment layer 18 of a region corresponding to the bottom shielding layer 13. As a result, the read head section 10 is completed.

Subsequently, the write head section 20 is formed on the read head section 10 in the following manner. Specifically, after forming the insulating layer 21 by a sputtering process or CVD method so as to cover the whole of the read head section 10, the lower magnetic pole 22 is formed by a frame plating process etc. on the insulating layer 21, as shown in FIG. 4. Here, CoFeNi, CoFe and FeN, or FeZrN as well as NiFe can be used. Further, the write gap layer 23 which has the opening 23A is formed so that the lower magnetic pole 22 may be selectively covered. Here, a sputtering process or CVD method may be used. Then, the coil 24 is formed on the write gap layer 23 by a frame plating process or the like and the insulating layer 25 is formed to partially cover the coils 24. After that, the upper magnetic pole 26 is formed so as to cover the insulating layer 25 and be connected to the lower magnetic pole 22, and a coil lead 24B is formed so as to be connected to an exposed portion of the coil 24 that is not covered with the insulating layer 25. Preferably, the insulating layer 25 is formed by exposing only a predetermined portion of the photoresist and heating it (curing). It is also preferred that the upper magnetic pole 26 and the coil lead 24B are formed by a frame plating process.

Finally, the protective film 27 is formed to cover the whole surface including the upper magnetic pole 26 by a sputtering process or the like, then a planarizing procedure is applied as necessary by a CMP process or the like. That is the end of the formation process for the write head section 20, thus the thin film magnetic head 1 is completed.

Thus, according to the present embodiment, the cap layer 17 is formed to fill the gap between the pair of cap-layers 163, which are formed on the magnetic bias layer 162 located on both sides of the MR element 15. With such configuration, the upper surface of the magnetic bias layer 162 is in contact only with the cap-layer 17 and the cap-layer 163. Accordingly, if the cap layer 17 and the cap layer 163 are made of a material excellent in crystal lattice compatibility with the magnetic bias layer 162, the coercive force of the magnetic bias layer 162 is increased. What is more, roughness of the undersurface of the top shielding layer 19, which may be caused due to the height difference in the upper surface plane between the MR element 15 and the cap layer 163, can be improved. That allows the top shielding layer 19 to exhibit enough shielding effect for protecting the MR element 15 from unnecessary external magnetic fields other than a specified signal magnetic field. Accordingly, the thin film magnetic head 1 can comply with a magnetic recording medium with higher recording density and secure stability of reading operation.

EXAMPLE

Next, examples of the present invention will be explained hereinbelow.

Example 1

Based on the method of manufacturing as explained in the above-mentioned embodiment, a sample of the thin film magnetic head 1, including the read head section 10 whose section structure was shown in FIG. 5, was fabricated. Here, the cap layer 17 and the cap layer 163 were formed of chromium to the thickness of 4 nm, and the read gap was formed to the thickness of 34 nm. The magnetic bias layer 162 was made of CoPt, the gap adjustment layer was made of ruthenium, and the bottom shielding layer 13 and the top shielding layer 19 were made of NiFe.

Example 2

A sample of the thin film magnetic head 1 including the read head section 10 was fabricated in the same manner as Example 1 except that the cap layer 17 and the cap layer 163 was formed to the thickness of 2 nm and the read gap was formed to the thickness of 32 nm.

Example 3

A sample of the thin film magnetic head 1 including the read head section 10 was fabricated in the same manner as Example 1 except that the component material of the cap layer 17 was tantalum.

Comparative Example 1

A sample of the thin film magnetic head including a read head section 110 whose section structure was shown in FIG. 12 was fabricated. Here, the cap layer 17 was not formed and the gap adjustment layer 118 was formed so that a portion thereof covering the MR element 115 was formed to the thickness of 2 nm, and the read gap was formed to the thickness of 32 nm.

Comparative Example 2

A sample of the thin film magnetic head including the read head section 110 was fabricated in the same manner as Comparative example 1 except that the gap adjustment layer 118 was made of tantalum.

Read resolution and output change ratio between before/after applying a recording current were tested about the samples of the above-mentioned Examples 1 to 3 and Comparative examples 1 and 2. As for the read resolution, a signal at 1500 kFCI (flux changes per inch) was defined as 1 T (one cycle), and evaluation was made by calculating a signal intensity ratio between a signal at 750 kFCI (2 T) or one-half of 1 T and a signal at 250 kFCI (6 T) or one-sixth of 1 T. As for the output change ratio, QST (quasi-static test) was carried out to obtain how much was the output change at the time that a recording current (55 mA) was applied to the coil 24 of the write head section 20, as compared with the output before applying the recording current, namely, "the output ratio between before/after applying the recording current" was calculated. Results are shown in Table 1 and Table 2.

TABLE 1

| | Configuration | Cap layer 17 | | Read gap (nm) | Read resolution (2T/6T) | Output change ratio (%) |
|---|---|---|---|---|---|---|
| | | Component material | Thickness (nm) | | | |
| Example-1 | FIG. 5 | Cr | 4 | 34 | 0.42 | 55 |
| Example-2 | FIG. 5 | Cr | 2 | 32 | 0.46 | 57 |
| Example-3 | FIG. 5 | Ta | 4 | 34 | 0.43 | 78 |

TABLE 2

| | Configuration | Gap adjustment layer 18 | | Read Gap (nm) | Read Resolution (2T/6T) | Output change ratio (%) |
|---|---|---|---|---|---|---|
| | | Component material | Thick (nm) | | | |
| Comparative Example 1 | FIG. 12 | Cr | 2 | 32 | 0.43 | 82 |
| Comparative Example 2 | FIG. 12 | Ta | 2 | 32 | 0.43 | 87 |

As shown in Tables 1 and 2, it was found that Examples 1 to 3 made it possible to keep the same level of the read resolution as Comparative examples 1 and 2 while decrease the output change ratio compared with Comparative examples 1 and 2 because of the presence of the cap layer 17. That may be because roughness of the undersurface of the top shielding layer 19, which is due to the height difference in the upper surface plane between the MR element 15 and the cap layer 163, are improved by the presence of the cap layer 17, thereby allowing the top shielding layer 19 to exhibit enough shielding effect for protecting the MR element 15 from unnecessary external magnetic fields. In particular, it was found that the output change ratio was much more suppressed when the cap layer 17 was made of chromium, whose lattice constant was closer to CoPt than tantalum.

Although the present invention has been described with reference to the above embodiment and examples, the invention is not limited to the embodiments and examples but can be variously modified. For example, in the present embodiment, although a write head section with a longitudinal write system is described as one example, the present invention is not limited to this and can also take a write head section with a vertical write system.

Association of reference numerals and component elements in the present embodiment is shown below. 1: thin film magnetic head, 2: head gimbal assembly (HGA), 2A: slider, 2B: suspension 3: arm 4: actuator 5: fixed axle 6: bearing, 7: spindle motor, 10, 10A, 10B: read head section, 11: substrate, 11S: recording-medium-facing-surface (ABS), 12: insulating layer, 13: bottom shielding layer, 13P: electrode, 14: insulating layer, 15: magnetoresistive (MR) element, 16: magnetic domain controlling layer, 161: buffer layer, 162: magnetic bias layer, 163: cap layer, 17: cap layer, 18: gap adjustment layer, 19: top shielding layer, 19P: electrode, 21: insulating layer, 22: lower magnetic pole, 23: write gap layer, 23A: opening, 24: coil, 24A, 24B: coil lead, 24S, 24E: electrode, 25: insulating layer 26: upper magnetic pole, 27: protective film, 41: foundation layer, 42: antiferromagnetic layer (pinning layer), 43: magnetically pinned layer (pinned layer), 44: intervening layer, 45: magnetically free layer (free layers), 100: housing, 200: magnetic recording medium, 300: head arm assembly (HAA)

What is claimed is:

1. A thin film magnetic head, comprising:
    a magnetoresistive element exposed to a recording-medium-facing-surface facing a magnetic recording medium and detecting a signal magnetic field applied from the magnetic recording medium;
    a pair of magnetic bias layers disposed on both sides, in a track-width direction of the magnetic recording medium, of the magnetoresistive element, and applying a bias magnetic field to the magnetoresistive element;
    a bottom magnetic shielding layer and a top magnetic shielding layer both exposed to the recording-medium-facing-surface, and sandwich the magnetoresistive element and the pair of magnetic bias layers in a stacking direction orthogonal to the track-width direction;
    a pair of first cap layers provided between the pair of magnetic bias layers and the top magnetic shielding layer so as to cover the pair of magnetic bias layers, each of the first cap layers having a side face; and
    a second cap layer provided between the magnetoresistive element and the top magnetic shielding layer so as to cover an entire upper surface of the magnetoresistive element and the side face of each of the first cap layers,
    wherein:
    the pair of first cap layers extend so that upper surfaces thereof is located at a same height in the thickness direction, the height being same as an upper surface of the second cap layer; and
    each of the first cap layers have an undersurface, which is nearest to the bottom magnetic shielding layer, and an upper surface parallel to the undersurface and connected to the undersurface by the side face, the upper surface being shorter than the undersurface such that the side face of each of the first cap layers faces upward.

2. The thin film magnetic head according to claim 1, further comprising a gap adjustment layer which covers both of the pair of first cap layers and the second cap layer.

3. The thin film magnetic head according to claim 1, further comprising a pair of insulating layers disposed between the pair of magnetic bias layers and the bottom magnetic shielding layer,
    wherein the bottom magnetic shielding layer and the top magnetic shielding layer are electrodes for supplying a sensing current to the magnetoresistive element in the stacking direction.

4. The thin film magnetic head according to claim 1, wherein
    the pair of magnetic bias layers are made of cobalt platinum alloy (CoPt); and
    the pair of first cap layers are made of chromium (Cr).

5. The thin film magnetic head according to claim 4, wherein the pair of magnetic bias layers are disposed upon and in contact with a pair of buffer layers, which are made of chromium (Cr).

6. The thin film magnetic head according to claim 4, wherein the second cap layer is made of chromium (Cr).

7. A magnetic head slider comprising the thin film magnetic head according to claim 1, wherein the thin film magnetic head is mounted on a substrate.

8. A head gimbal assembly, comprising:
    a magnetic head slider in which the thin film magnetic head according to claim 1 is mounted on a substrate; and
    a suspension to which the magnetic head slider is attached to one end thereof.

9. A head arm assembly comprising:
    a magnetic head slider in which the thin film magnetic head according to claim 1 is mounted on a substrate;

a suspension to which the magnetic head slider is attached to one end thereof; and an arm which supports the other end of the suspension.

10. A magnetic disk device comprising a magnetic recording medium and a head arm assembly,
wherein the head arm assembly includes:
a magnetic head slider in which the thin film magnetic head according to claim 1 is mounted on a substrate;
a suspension to which the magnetic head slider is attached to one end thereof; and
an arm which supports the other end of the suspension.

11. The thin film magnetic head according to claim 1, wherein the second cap layer is in contact with a part of the upper surface of each of the magnetic bias layers.

12. The thin film magnetic head according to claim 11, wherein:
the pair of magnetic bias layers are each made of CoPt; and
the second cap layer is made of Cr.

13. The thin film magnetic head according to claim 1, wherein a level of the undersurface of each of the first cap layers is aligned with a level of an undersurface of the second cap layer.

14. A method of manufacturing a thin film magnetic head according to claim 1, comprising steps of:
forming a bottom magnetic shielding layer on a substrate;
forming a magnetoresistive film on the bottom magnetic shielding layer;
forming a mask pattern so as to selectively cover the magnetoresistive film, then selectively removing the magnetoresistive film using the mask pattern, thereby completing the magnetoresistive element;
forming a pair of insulating layers which continuously cover both side-faces, in a track-width direction of the magnetic recording medium, of the magnetoresistive element and a region of the bottom magnetic shielding layer where the magnetoresistive film was removed, then stacking a pair of magnetic bias layers and a pair of first cap layers on the pair of insulating layers so as to sandwich the magnetoresistive element in the track-width direction;
removing the mask pattern, then forming a second cap layer so as to cover an entire upper surface of the magnetoresistive element and part of the pair of first cap layers; and
forming a top magnetic shielding layer on the first and second cap-layers in a region corresponding to the bottom magnetic shielding layer,
wherein the pair of first cap layers are formed so that upper surfaces thereof may be located at a same height in the thickness direction, the height being same as an upper surface of the second cap layer.

15. The method of manufacturing the thin film magnetic head according to claim 14, wherein
the pair of magnetic bias layers are formed of cobalt platinum alloy (CoPt); and
the pair of first cap layers are formed of chromium (Cr).

16. The method of manufacturing the thin film magnetic head according to claim 15, further comprising a step of forming a buffer layer of chromium (Cr) between the insulating layer and the magnetic bias layer.

17. The method of manufacturing the thin film magnetic head according to claim 15, wherein the second cap layer is formed of chromium (Cr).

* * * * *